Oct. 25, 1927.

H. S. MACKAY 1,647,050

MEANS FOR ROASTING METALLIC ORES

Filed April 23, 1923  2 Sheets-Sheet 2

Inventor
H. S. Mackay
by Wilkinson & Giusta
Attorneys.

Patented Oct. 25, 1927.

1,647,050

UNITED STATES PATENT OFFICE.

HENRY SQUAREBRIGS MACKAY, OF LONDON, ENGLAND.

MEANS FOR ROASTING METALLIC ORES.

Application filed April 23, 1923, Serial No. 634,124, and in Great Britain May 19, 1922.

This invention refers to ore roasting furnaces of the well-known multiple hearth type wherein the various hearths are superposed and the ore supplied to the topmost hearth and thence swept or "rabbled" by mechanically operated means, such as the well-known rabble arms, from one hearth on to the next hearth below and so on while being subjected to the roasting heat on the various hearths in succession.

Now my present invention relates to improvements in the method of and means for roasting-in multiple hearth furnaces of the aforesaid type-ores containing a number of metals one or some of which it is desired to make soluble and others insoluble by such roasting, for example where it is desired to recover copper from an ore containing copper and iron, it is desirable so to control the roasting that the whole of the copper or as much copper as possible is made soluble thereby and the iron and other undesirable elements made insoluble, so that when the roasted ore is leached with acid the minimum amount of such acid is consumed and the least possible amount of impurities dissolved.

The method of and means for roasting metallic ores according to the present invention consists of or comprises controlling or regulating separately and independently the temperature on each hearth, the volume of air supplied to each hearth, and the time during which the ore remains on each hearth under the two first-named controlled or regulated conditions.

My invention also comprises other features and construction of apparatus all of which will be fully described hereinafter.

A circular multiple hearth furnace constructed according to this invention is designed to enable separate and independent control or regulation of the temperature on each hearth and of the volume of air supplied to each hearth and of the time during which the ore remains on each hearth under the two first-named conditions; and also a furnace according to my invention includes means for conducting the ore from hearth to hearth out of contact with flame from the heating elements and without sudden shock or jar which is productive of dust which in furnaces as heretofore employed is carried upwardly by the hot gases and pass with them from the furnace and consequently are lost and this loss is avoided by my invention.

My furnace includes other features and details of construction all of which will be more fully described hereinafter.

In a furnace constructed according to this invention it is possible to effect a very desirable control of the roasting operation which will result in converting to a substantially soluble compound the metal or metals which it is desired to recover from the ore, and also to render insoluble to a large extent the undersirable metal or metals.

A circular multiple hearth furnace constructed in accordance with my present invention is illustrated in the accompanying drawings in which:—

Figure 1:
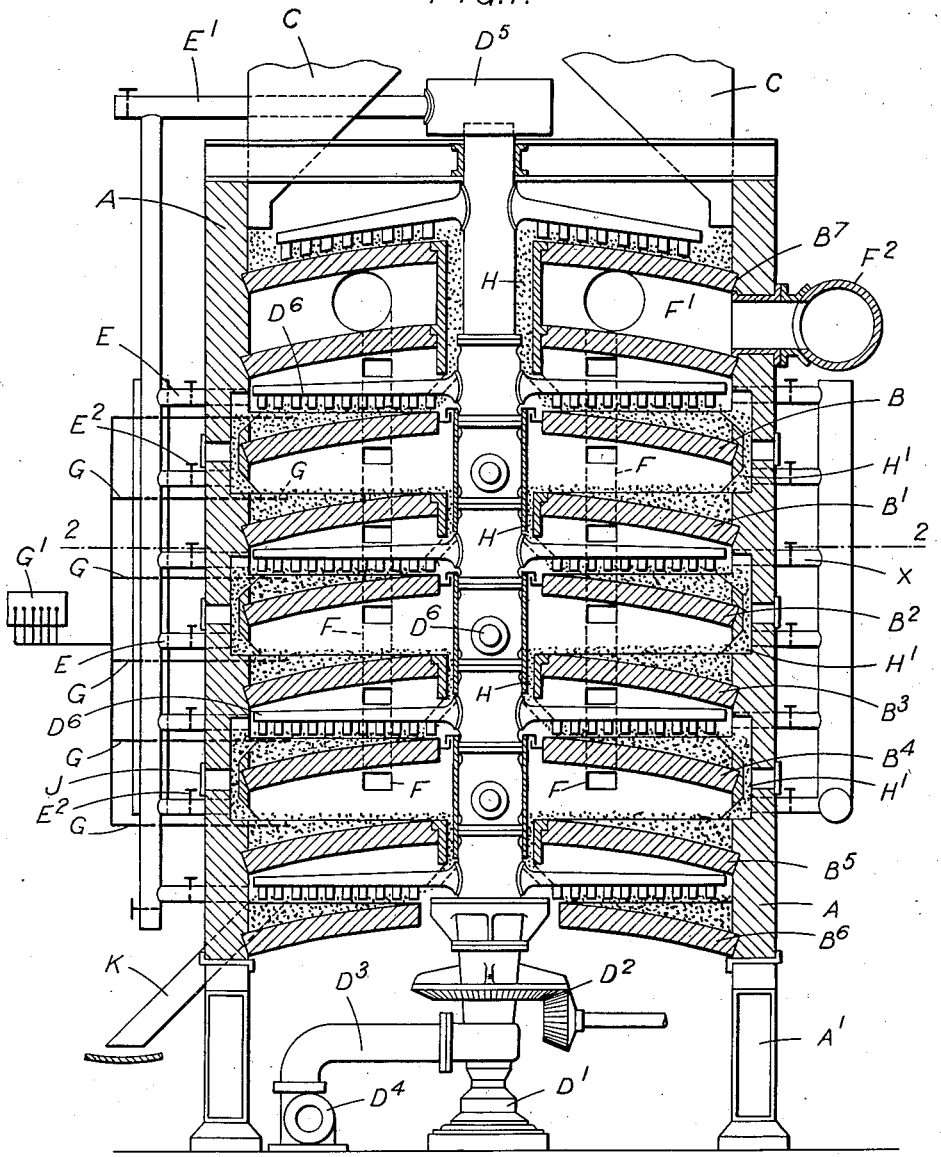
Fig. 1 is a longitudinal vertical section.
Figure 2:
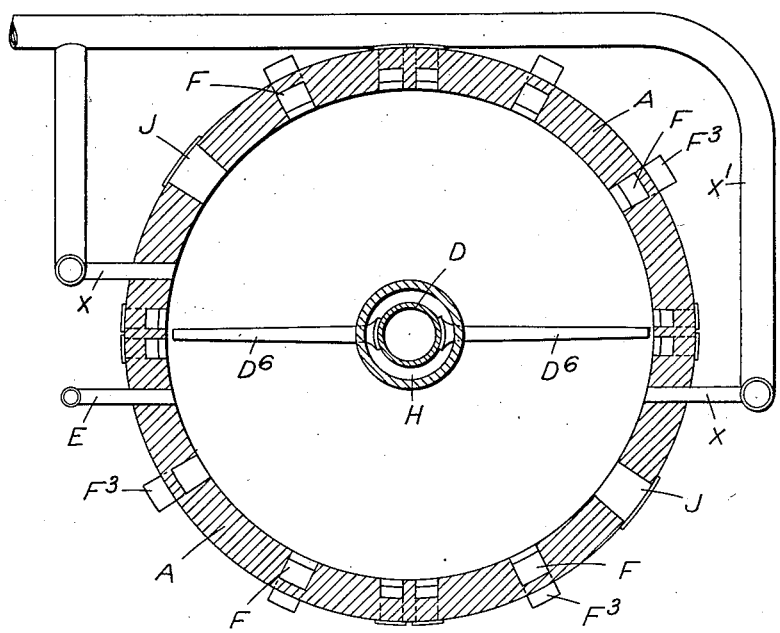
Fig. 2 is a cross-section on line 2—2 Fig. 1.

The circular wall A of the furnace is mounted upon the uprights or base $A^1$ and is provided, in the example illustrated, with seven circular hearths B, $B^1$, $B^2$, $B^3$, $B^4$, $B^5$ and $B^6$ and a further circular drying hearth $B^7$ located near the top of the furnace to receive the ore from chutes C.

A central shaft D is rotatably mounted on a step bearing $D^1$ at the bottom of the apparatus and is adapted to be rotated by bevel gearing $D^2$ from any suitable source of power. This shaft D is formed hollow and opens at its lower end to pipe $D^3$ connected to a fan or blower $D^4$, and at its upper end to a chamber $D^5$ from which a pipe $E^1$ leads to the air inlets E separately controlled by valves $E^2$, for supplying heated air for metal oxidizing purposes. The shaft D carries raking or "rabbling" arms $D^6$, two (or more) for each hearth, adapted to sweep the ore across their respective hearths as hereafter described. These rabbling arms conatin air passages arranged so that they are kept cool by the air passing up the central shaft D.

Each of the hearths is closed off (as hereafter described) from the other hearths and is provided with separate burners X connected to a gas or oil main $X^1$, said burners being individually controllable so as to vary at will, the heat supplied to the respective hearths.

Flues F open to the space between each pair of hearths and lead into the chamber $F^1$ near the top of the apparatus which opens to the exhaust pipe or chimney F². The openings from the flues F to the hearths are controlled by any suitable valves or dampers such as indicated at F³ in such-wise that the hot gases passing up the flues F can be directed on to any of the hearths or prevented from entering thereon as desired.

This arrangement of controllable flue openings in conjunction with the provision of separate burners for each hearth permits of independent control of the temperature on each hearth, and for the purpose of observation of the temperature conditions on each hearth thermoelectric pyrometers, diagrammatically indicated at G, other equivalent heat-indicating means are provided, all of these means being advantageously connected to a suitable indicator shown diagrammatically at G¹.

The ore instead of being permitted to drop through openings in the hearth on to the hearth next below is swept or rabbled from the outer to the inner edge of one hearth and thence conducted by chutes H to the hearth next below and there swept outwardly to chutes H¹ located in the wall A of the furnace, on to the next hearth, and thence inwardly again to the next chutes H and so on throughout the travel from top to bottom of the furnace. These chutes H and H¹ are preferably partly sloped e. g. towards the bottom thereof as shown and are advantageously kept full of ore during the roasting operations so that the ore passes quietly downwardly therein without being subjected to shocks or jars caused by falling any distance. Furthermore the chutes prevent direct contact of the ore with naked flame while the ore is passing down said chutes and thus prevent overheating of the ore and consequent formation of insoluble compounds of the metal which it is desired to recover.

Inspection doors J are provided in the wall of the furnace as and where desired.

The operation of the furnace is as follows:—

The ore for treatment is fed to the platform B⁷ through the chutes C and passes thence from hearth to hearth throughout the furnace as hereinbefore described. Air is blown through pipe D³ into the hollow shaft D and arms D⁶ and becomes highly heated in its passage therethrough to the chamber D⁵, whence it is forced to the various inlets E through the pipe E¹. No heat is supplied to the lowermost hearth B⁶ and there the ore may be rabbled in excess air for further oxidizing purposes if desired, and also for cooling the ore, before discharge from the furnace through chute K.

A furnace constructed as above described is suitable for roasting any ores, but is especially suitable for roasting copper ore which is afterwards to be treated by an electro-chemical process and by way of example I will describe such method of roasting, (in a furnace according to this invention) copper ore containing iron; the purpose of such roasting being to form soluble compounds of the copper and insoluble compounds of the iron and other undesirable elements.

According to this invention I carry out the roasting operation as follows:—

In the seven hearth furnace just described, on hearths B, B¹, and B² for example, the temperature of the ore, the time the ore remains exposed to the temperature and the air supplied to these hearths are all so regulated that a large percentage of the copper will combine as a sulphate and oxide allowing only a small percentage of iron to combine as a sulphate. The following are examples of suitable temperatures to be maintained to bring about these re-actions: 1st hearth—420° C. or thereabouts, 2nd hearth—450° C. or thereabouts, 3rd hearth—490° C. or thereabouts. The air supplied and the time the ore remains in these temperatures will of course vary in accordance with the character of the ore being treated.

In the second stage of this process I increase the temperature on, and the air supplied to, hearths B³, B⁴ and B⁵ so as to oxidize the iron sulphate formed in the first stage to insoluble ferric oxide (the remaining percentage of iron being also converted to insoluble ferric oxide in this second stage) without decreasing the percentage of soluble copper formed in the first stage. The following are examples of suitable temperatures to be maintained to effect this second action:—4th hearth—550° C. or thereabouts, 5th hearth—590° C. or thereabouts, 6th hearth—590° C. or thereabouts.

On the seventh hearth no heat is applied and the ore is rabbled in excess air and the temperature reduced by this means, the ore being then discharged from the furnace.

By this method of roasting according to this invention advantage is taken of the difference in the molecular heat of formation of copper sulphate and that of iron sulphate and also of the difference between the temperatures required to decompose copper sulphate and iron sulphate.

Ferrous sulphate begins to decompose at about 500° C. and is entirely decomposed at about 590° C. Cupric sulphate begins to decompose at about 580° C. and is not entirely decomposed until a temperature of about 700° C. is reached, so that ferrous sulphate can be decomposed to insoluble ferric oxide in the presence of cupric sulphate.

Thus by the method above described copper is made soluble and iron insoluble because the ferrous sulphate formed in the first stage of the roasting operations is oxidized to the insoluble ferric oxide in the second stage without materially affecting the soluble copper formed in the first stage.

My invention is not limited to the precise details of the furnace construction hereinbefore described, such being by way of one suitable example only of a furnace wherein each hearth or group of hearths is or are independently controllable as regards temperature conditions and proportion of air supplied thereto, the means for effecting such control and for conducting the ore from hearth to hearth being obviously susceptible of modifications within the spirit and scope of the invention.

What I claim is:—

1. A multiple hearth ore-roasting furnace constructed to secure accurate regulation of the roasting conditions on each hearth independently of the others, having in combination conduits for conducting the ore from hearth to hearth arranged adjacent the inner and outer edges respectively of successive hearths and adapted to be maintained substantially full of ore throughout the roasting operation so as to isolate the ore for the time being on each hearth, mechanically rotated arms for crowding the ore into said conduits, independently controllable means for supplying fuel to each hearth, independently regulatable means for admitting air to each hearth, and means for controlling the exhaust of hot gases from each hearth independently of the others.

2. A multiple hearth ore-roasting furnace comprising the combination of conduits for conducting the ore from hearth to hearth arranged adjacent the inner and outer edges respectively of successive hearths and (adapted to be maintained substantially full of ore throughout the roasting operation so as to isolate the ore for the time being on each hearth), a central rotative shaft carrying radial raking arms to crowd the ore into said conduits, said shaft and said raking arms being provided with air cooled passages, means for conducting the heated air from said shaft to each hearth, independently operable dampers controlling such air admission to each hearth, separate controllable burners for heating each hearth, and means for regulating the exhaust of hot gases from each hearth independently of the others.

HENRY SQUAREBRIGS MACKAY.